Patented Mar. 6, 1923.

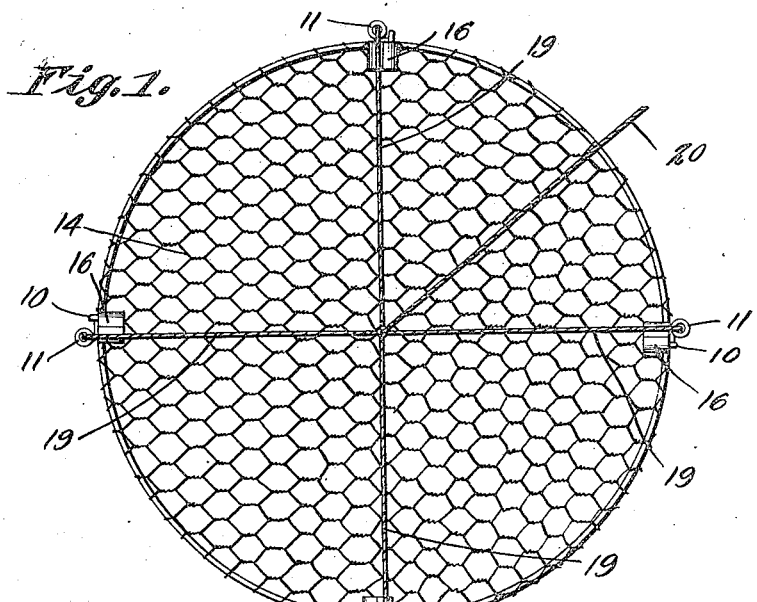
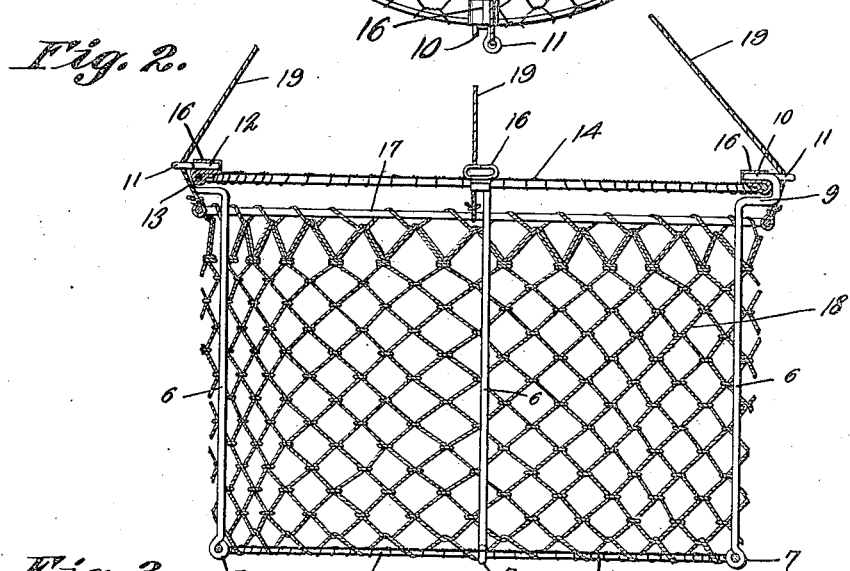
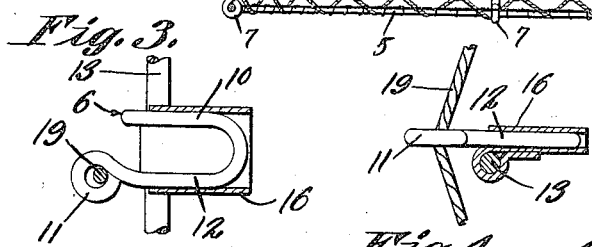

1,447,502

UNITED STATES PATENT OFFICE.

STEPHEN ASANIO AND LOUIS MARCONI, OF NEW YORK, N. Y.

CRAB NET.

Application filed June 2, 1922. Serial No. 565,295.

*To all whom it may concern:*

Be it known that we, STEPHEN ASANIO and LOUIS MARCONI, citizens of the United States, residing at New York, in the county of New York, State of New York, have invented a new and useful Crab Net, of which the following is a specification.

This invention relates to nets, and more particularly to nets especially designed for catching crabs, fish or the like.

The primary object of the invention is to provide a net which will completely house the crab or fish being caught, to eliminate any possibility of the crab or fish liberating himself.

Another object of the invention is to provide a net of this character which is collapsible, and one which consumes comparatively little space in storing or carrying.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of the crab net.

Figure 2 is a longitudinal sectional view thereof.

Figure 3 is a sectional view through one of the keepers, carried by the cover of the net.

Figure 4 is a sectional view through one of the keepers taken at right angles to Figure 3.

Referring to the drawing in detail, the net embodies a bottom member 5 which is preferably circular in formation, and covered with wire mesh material.

Uprights 6 are formed with eyes 7 at the lower end thereof, which eyes embrace portions of the circular member 8, forming the support for the wire mesh material of the bottom member 5.

The upper ends of the members 6 extend outwardly as at 9 where the same extends inwardly as at 10, the extreme ends thereof being formed into eyes 11, while the portions between the eyes and inwardly extended portions 10 extend outwardly as at 12 providing spring catch members including arms 10 and 12. The cover of the net embodies a circular member 13 covered with wire mesh material 14, there being provided keepers 16 disposed in spaced relation with each other and connected with the circular member 13.

These keepers are relatively wide and accommodate the latch members as described, it being understood that the spring arms frictionally contact with the walls of the keepers to hold the latch members within the keepers when the net is in its extended position.

The body portion of the net includes a ring member 17 to which is secured the flexible netting 18, the lower end of the netting being connected with the member 8, so that when the ring member 17 is moved upwardly to close the net, the netting 18 will house the uprights 6 and prevent the escape of a crab or fish caught within the net.

Secured to the ring member 17 are the flexible connecting members 19 which extend through the eyes 11 of the uprights, the flexible members being connected with a controlling string 20, which, when pulled by the person using the net, will cause the ring member together with the netting 18, to be moved to its extended position, the ring member 17 contacting with the upper ends of the uprights 6 to lift the net together with the contents thereof.

In the use of the device, it is contemplated to place bait within the net, in any suitable manner, the net then being lowered into the water. When a crab or fish has passed into the net, to obtain the bait, the operator by pulling the string 20, moves the ring member 17 together with the netting 18 to a position as shown by Figure 2 of the drawings, to the end that the fish or crab within the net is caught and may only be released by lowering the ring member 17 and netting 18.

Having thus described the invention, what is claimed as new is:—

1. A net comprising a bottom member formed of wire mesh material, uprights having pivotal connection with the bottom member and having latch members formed at the upper ends thereof, a cover having keepers to receive the latch members, a ring member movable over the uprights, flexible net material having connection with the ring member and having its lower end secured to the bottom member, and means for moving the ring member to the upper ends of the uprights to provide the body portion of the net.

2. A net comprising a bottom member formed of mesh material, a cover having keepers uprights having spring arms at the upper ends thereof, said spring arms adapted to move into the keepers and frictionally engage the side walls thereof, one of said spring arms having an eye, flexible members extending through the eyes, a movable ring member carrying a body portion of netting material, said ring member adapted to move under the cover to extend the netting material when the flexible members are pulled.

In testimony that we claim the foregoing as our own, we have hereto affixed our signatures in the presence of two witnesses.

STEPHEN ASANIO.
LOUIS MARCONI.

Witnesses:
JOSEPH RINALDI,
FRANK SETTEDUCATO.